US008485733B2

(12) United States Patent
 Miyachi

(10) Patent No.: US 8,485,733 B2
(45) Date of Patent: Jul. 16, 2013

(54) ROLLER BEARING CAGE AND ROLLER BEARING

(75) Inventor: Takeshi Miyachi, Yao (JP)

(73) Assignee: JTEKT Corporation, Osaka (JP)

( * ) Notice: Subject to any disclaimer, the term of this patent is extended or adjusted under 35 U.S.C. 154(b) by 56 days.

(21) Appl. No.: 13/233,622

(22) Filed: Sep. 15, 2011

(65) Prior Publication Data

US 2012/0082409 A1    Apr. 5, 2012

(30) Foreign Application Priority Data

Oct. 5, 2010   (JP) ................................. 2010-225617

(51) Int. Cl.
 *F16C 33/46*   (2006.01)
 *F16C 33/49*   (2006.01)
 *F16C 33/50*   (2006.01)

(52) U.S. Cl.
 USPC ........... 384/572; 384/574; 384/577; 384/578; 384/580

(58) Field of Classification Search
 USPC ................. 384/548, 567, 571–572, 574–575, 384/577–578, 580, 560
 See application file for complete search history.

(56) References Cited

U.S. PATENT DOCUMENTS

| | | | | |
|---|---|---|---|---|
| 612,472 | A * | 10/1898 | Woodcock | 384/575 |
| 1,426,578 | A * | 8/1922 | Lott | 384/577 |
| 3,102,760 | A * | 9/1963 | Aho | 384/575 |
| 3,353,881 | A * | 11/1967 | Steinert | 384/577 |
| 5,039,231 | A * | 8/1991 | Kispert et al. | 384/572 |
| 5,743,660 | A * | 4/1998 | Hillmann | 384/577 |
| 5,957,592 | A * | 9/1999 | Yamanaka | 384/526 |
| 7,220,060 | B2 * | 5/2007 | Kono et al. | 384/577 |
| 7,390,127 | B2 * | 6/2008 | Kono et al. | 384/572 |
| 7,766,555 | B2 * | 8/2010 | Kono et al. | 384/572 |
| 2005/0117827 | A1 * | 6/2005 | Fujii et al. | 384/510 |

FOREIGN PATENT DOCUMENTS

| | | |
|---|---|---|
| JP | U-45-27132 | 10/1970 |
| JP | B-47-21645 | 6/1972 |
| JP | A-2007-100738 | 4/2007 |
| JP | A-2007-205557 | 8/2007 |
| JP | A-2007-247687 | 9/2007 |
| JP | A-2007-247820 | 9/2007 |
| JP | A-2007-255534 | 10/2007 |

(Continued)

OTHER PUBLICATIONS

Extended European Search Report issued in European Patent Application No. 11183778.7 dated Jul. 6, 2012.

*Primary Examiner* — Marcus Charles
(74) *Attorney, Agent, or Firm* — Oliff & Berridge, PLC

(57) ABSTRACT

A cage is formed of a plurality of spacers that are arranged along a circumference of a same circle. Each spacer includes: first, second and third cage bars extending in substantially an axial direction of the circle and located at intervals from each other; a first coupling portion that couples an end portions of the first and second cage bars at one of the axial direction; and a second coupling portion that couples the other end portions of the second and third cage bars at the other one of the axial direction. The first cage bar, the second cage bar and the first coupling portion define a first pocket that is open at the other one of the axial direction side, and the second cage bar, the third cage bar and the second coupling portion define a second pocket that is open at the one of the axial direction side.

4 Claims, 3 Drawing Sheets

FOREIGN PATENT DOCUMENTS

| | | |
|---|---|---|
| JP | A-2007-255535 | 10/2007 |
| JP | A-2007-263210 | 10/2007 |
| JP | A-2008-64248 | 3/2008 |
| JP | A-2008-298272 | 12/2008 |
| JP | A-2008-298274 | 12/2008 |
| JP | A-2009-52746 | 3/2009 |

* cited by examiner

ROLLER BEARING CAGE AND ROLLER BEARING

CROSS REFERENCE TO RELATED APPLICATIONS

The disclosure of Japanese Patent Application No. 2010-225617 filed on Oct. 5, 2010 including the specification, drawings and abstract is incorporated herein by reference in its entirety.

BACKGROUND OF THE INVENTION

1. Field of the Invention

The invention relates to a roller bearing cage that retains, for example, cylindrical rollers, tapered rollers, convex rollers, or the like, and also relates to a roller bearing.

2. Description of Related Art

A roller bearing cage is, for example, described in Japanese Patent Application Publication No. 2007-100738 (JP-A-2007-100738).

The roller bearing cage includes a plurality of spacers. The spacers are arranged along the same circle. Each spacer includes a cage bar, a first axial movement restricting portion and a second axial movement restricting portion. The cage bar extends in the axial direction of the roller bearing. In addition, the first axial movement restricting portion extends from one end portion of the cage bar in the axial direction toward one side in the circumferential direction, and the second axial movement restricting portion extends from the other end portion of the cage bar in the axial direction toward the other side in the circumferential direction.

In a state where the roller bearing cage is assembled to the roller bearing, the first axial movement restricting portion of each spacer axially faces the second axial movement restricting portion of the spacer adjacent to the above spacer in the circumferential direction.

The roller bearing cage forms a substantially annular pocket by the cage bar of the spacer, the first axial movement restricting portion of that spacer, the cage bar of the spacer adjacent to that spacer and the second movement restricting portion of the adjacent spacer to accommodate a roller in that pocket.

Because the roller bearing cage is formed of the plurality of spacers, even when the roller bearing is a large-sized bearing of which an annular cage is difficult to be manufactured by pressing, each spacer may be formed by pressing, so a roller bearing cage for a large-sized bearing may be easily manufactured at low cost.

However, in the above roller bearing cage, when lead and lag of rollers based on variations in the roller size, or the like, occur, the distance between a spacer and a spacer adjacent to that spacer locally increases and, as a result, the spacers may slip off.

In addition, it is difficult to adjust the positions of each spacer and a spacer adjacent to that spacer, and it is difficult to assemble the rollers, the roller bearing cage and inner and outer rings together.

SUMMARY OF THE INVENTION

The invention provides a roller bearing cage of which each spacer is hard to slip off and that has excellent assemblability. In addition, the invention provides a roller bearing that includes the roller bearing cage.

A first aspect of the invention relates to a roller bearing cage. The roller bearing cage includes: a plurality of spacers (separators) that are arranged along a circumference of the same circle. Each of the spacer includes: a first cage bar that extends in substantially an axial direction, that is a direction perpendicular to a radial direction of the circle and perpendicular to the circumferential direction, of the circle; a second cage bar that is located on one side of the first cage bar in the circumferential direction of the circle and that extends in substantially the axial direction; a third cage bar that is located on one side of the second cage bar in the circumferential direction and that extends in substantially the axial direction; a first coupling portion that couples an end portion of the first cage bar at one of the axial direction to an end portion of the second cage bar at the one of the axial direction; and a second coupling portion that couples the other end portion of the second cage bar at the other one of the axial direction to the other end portion of the third cage bar at the other one of the axial direction. The first cage bar, the second cage bar and the first coupling portion define a first pocket that is open at the other one of the axial direction side, and the second cage bar, the third cage bar and the second coupling portion define a second pocket that is open at the one of the axial direction side.

According to the above aspect, each of the spacers has two first and second pockets, the first and second pockets are formed by one spacer, and the first and second pockets are not formed by a plurality of spacers. Thus, the assemblability of rollers is excellent.

If each spacer has a general crank shape, the spacers are able to move independently of rollers, so, when a gap that occurs because of lead and lag of the rollers locally concentrates, the crank-shaped spacers may disassemble or the spacers may get stuck.

In contrast to this, according to the above aspect, each spacer has an S shape and each spacer is configured to retain two rollers, so one spacer cooperates with two rollers and each spacer does not move independently of the rollers. Thus, even when a circumferential gap between specific two rollers adjacent to each other in the circumferential direction increases because of lead and lag of the rollers, because one spacer cooperates with two rollers, each spacer does not slip off from the circumferential gap between the specific two millers or no slipped-off spacer gets stuck.

In addition, some of cages that use general spacers that are not limited to crank-shaped spacers may have a guide member that prevents disassembling of the spacers; however, the spacers used in the aspect of the invention do not require such a guide member at all.

In addition, according to the above aspect, each spacer has an S shape, each spacer retains two rollers and a roller may be retained or may not be retained in a circumferential gap between two spacers adjacent to each other in the circumferential direction, so, when lead and lag of the rollers occur, basically, load in the circumferential direction from the rollers may be received as compression strain that occurs in the cage bars of each spacer and that is hard to cause breakage.

More specifically, when lead and lag occur in the roller between the adjacent spacers, the lead and lag may be received by the cage bars of the spacers before and behind in the traveling direction of the roller as compression strain. In addition, when lead and lag occur in the rollers inside the pockets of each spacer, tensile strain in the direction to expand the cage bar before or behind in the traveling direction in the pocket temporarily occurs; however, force that cancels the tensile strain is immediately applied from the roller present before or behind in the traveling direction of that lead and lag to the cage bar receiving the tensile strain. Thus, only tensile strain that can be absorbed through the S shape occurs in the cage bars of each spacer, and the cage bars of each spacer are basically able to receive lead and lag of the rollers through compression strain. Thus, according to the above aspect, only compression strain that is hard to cause breakage basically occurs in the cage bars of each spacer, so the strength and durability of the cage may be remarkably excellent.

In addition, according to the above aspect, the cage is formed of a plurality of components that are separate from one another, so, even when the roller bearing is a large-sized bearing having the outside diameter of about 2 m, components (for example, spacers) may be manufactured by a method, such as pressing and injection molding, by which small components may be manufactured at low cost, and it is possible to manufacture the cage at low cost.

In addition, according to the above aspect, a roller may not be retained in about one gap between the adjacent spacers depending on the diameter of a bearing used. Thus, the cage according to the above aspect may be easily applied to a roller bearing having any size as circumstances demand, so the flexibility of arrangement increases. In contrast to this, in the general crank-shaped cage, the size of each spacer should be strictly and precisely determined on the basis of the diameter of a bearing used.

A second aspect of the invention relates to a roller bearing. The roller bearing includes: an inner raceway member that has an outer raceway surface; an outer raceway member that has an inner raceway surface; a plurality of rollers that are arranged between the inner raceway member and the outer raceway member; and the roller bearing cage according to the first aspect that retains the plurality of rollers.

According to the above aspect, the durability of the roller bearing cage may be improved, so it is possible to extend the service life. In addition, the roller bearing cage may be formed at low cost, so it is possible to reduce manufacturing cost. In addition, the assemblability of the roller bearing is excellent.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
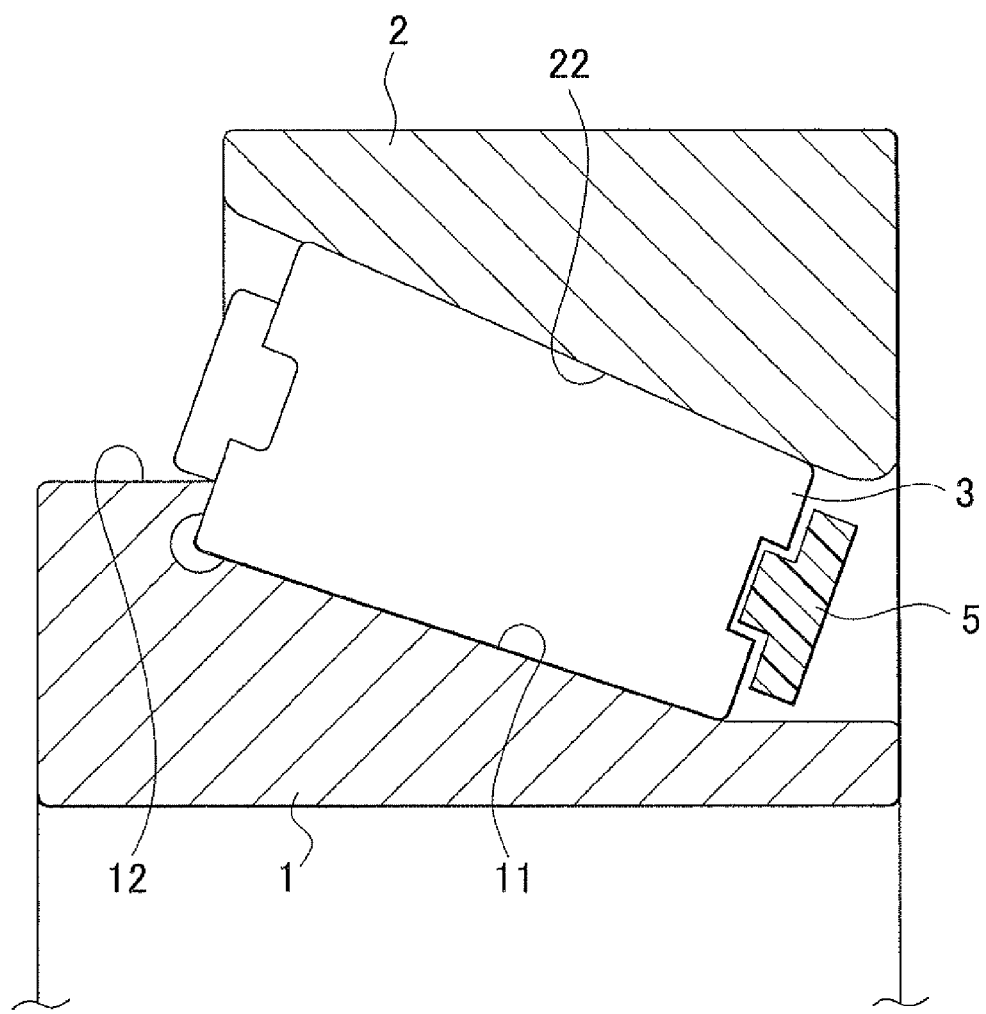
FIG. 1 is a schematic axial cross-sectional view of a tapered roller bearing according to an embodiment of the invention.

FIG. 1 is a schematic axial cross-sectional view of a tapered roller bearing according to an embodiment of the invention.

The tapered roller bearing includes an inner ring 1, an outer ring 2, a plurality of tapered rollers 3 and a roller bearing cage (hereinafter, simply referred to as cage) 5. The inner ring 1 is an example of an inner raceway member. The outer ring 2 is an example of an outer raceway member. The plurality of tapered rollers 3 serves as a plurality of rollers.

The inner ring 1 has an outer peripheral conical raceway surface 11 and a rib 12. The rib 12 is located at a large diameter side of the outer peripheral conical raceway surface 11 in the axial direction. In addition, the outer ring 2 has an inner peripheral conical raceway surface 22. In addition, the plurality of tapered rollers 3 are arranged at intervals in the circumferential direction in a state where the tapered rollers 3 are retained by the cage 5 between the outer peripheral conical raceway surface 11 of the inner ring 1 and the inner peripheral conical raceway surface 22 of the outer ring 2.

Figure 2:
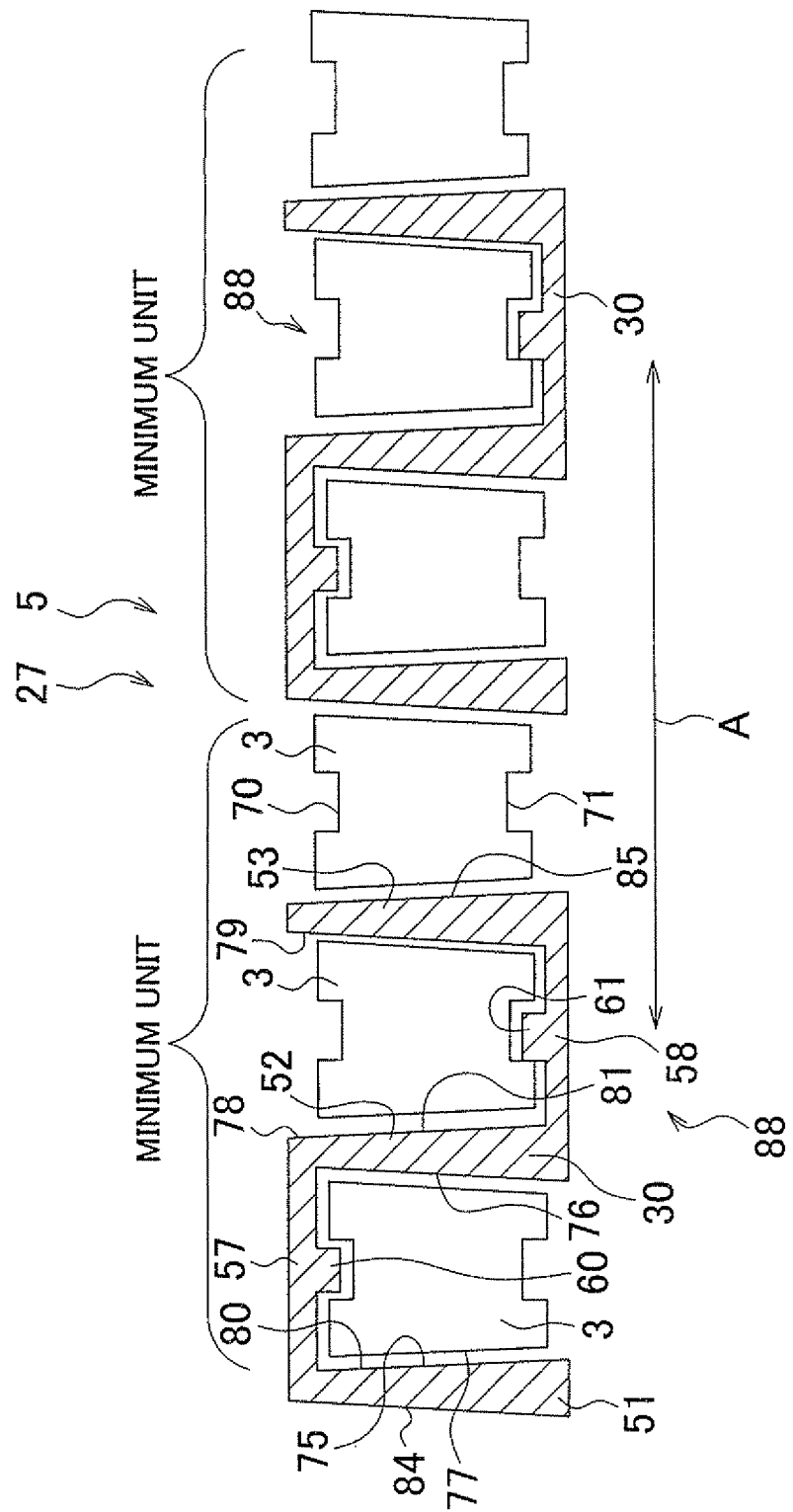
FIG. 2 is a plan view that shows part of a tapered roller assembly formed of a plurality of tapered rollers and a cage.

FIG. 2 is a plan view that shows part of a tapered roller assembly 27 formed of the plurality of tapered rollers 3 and the cage 5 in the tapered roller bearing shown in FIG. 1.

The tapered roller assembly 27 is arranged along the circumference of a pitch circle of the tapered roller bearing (in the tapered roller bearing, a circle that passes through the point at the center of the axial length of each tapered roller in the central axis of that tapered roller. In FIG. 2, the direction indicated by the arrow A indicates the circumferential direction of the pitch circle. As shown in FIG. 2, the tapered roller assembly 27 includes a plurality of substantially S-shaped spacers 30 and the plurality of tapered rollers 3.

Each spacer 30 includes a first cage bar 51, a second cage bar 52, a third cage bar 53, a first coupling portion (first rim portion) 57 and a second coupling portion (second rim portion) 58. Each of the first cage bar 51, the second cage bar 52 and the third cage bar 53 extends in substantially the axial direction, that is a direction perpendicular to a radial direction of the pitch circle and perpendicular to the circumferential direction, of the pitch circle. The second cage bar 52 is located on one side of the first cage bar 51 in the circumferential direction A. The third cage bar 53 is located on one side of the second cage bar 52 in the circumferential direction A. The axial direction of the pitch circle constitutes a first direction. Moreover, each of the first cage bar 51, the second cage bar 52 and the third cage bar 53 extends in a direction that at least includes the axial direction.

The first coupling portion 57 couples an end portion of the first cage bar 51 at one of the axial direction side to an end portion of the second cage bar 52 at the one of the axial direction side. In addition, the second coupling portion 58 couples the other end portion of the second cage bar 52 at the other one of the axial direction side to the other end portion of the third cage bar 53 at the other one of the axial direction side. Each of the first coupling portion 57 and the second coupling portion 58 extends substantially parallel to the circumferential direction A on the plane of FIG. 2.

As shown in FIG. 2, each of the first cage bar 51, the second cage bar 52 and the third cage bar 53 has a shape such that the circumferential size direct-functionally (linearly) increases from one of the axial direction side toward the other one of the axial direction side. In addition, an end surface 78 of the second cage bar 52, adjacent to the third cage bar 53, and an end surface 79 of the third cage bar 53, adjacent to the second cage bar 52, have shapes corresponding to a rolling surface 77 of the tapered roller 3.

An end surface of the first coupling portion 57 in the other one of the axial direction side has a substantially cylindrical first protrusion 60 that protrudes toward the other one of the axial direction side at the center portion in the direction in which the first coupling portion 57 extends. An end surface of the second coupling portion 58 in the one of the axial side direction has a substantially cylindrical second protrusion 61 that protrudes toward the one of the axial direction side at the center portion in the direction in which the second coupling portion 58 extends. In addition, each tapered roller 3 has a large-diameter end surface and a small-diameter end surface in the axial direction, and has a first recess 70 at the center portion of the large-diameter end surface and a second recess 71 at the center portion of the small-diameter end surface. The first recess 70 has a shape corresponding to the first protrusion 60 of the first coupling portion 57. The second recess 71 has a shape corresponding to the second protrusion 61 of the second coupling portion 58.

An end surface of the first cage bar 51, adjacent to the second cage bar 52, an end surface of the second cage bar 52, adjacent to the first cage bar 51, and the side end surface of the first coupling portion 57 in the other one of the axial direction define a first pocket 80. An end surface of the second cage bar 52, adjacent to the third cage bar 53, an end surface of the third cage bar 53, adjacent to the second cage bar 52, and the end surface of the second coupling portion 58 in the one of the axial direction define a second pocket 81.

As shown in FIG. 2, the end surface of the first cage bar 51, adjacent to the second cage bar 52, and the end surface of the second cage bar 52, adjacent to the first cage bar 51, guide the rolling surface 77 of the corresponding tapered roller 3, and the first protrusion 60 of the first coupling portion 57 is fitted in the first recess 70 of the large-diameter end surface of the tapered roller 3 to retain the tapered roller 3 in the first pocket 80.

In addition, the end surface of the second cage bar 52, adjacent to the third cage bar 53, and the end surface of the third cage bar 53, adjacent to the second cage bar 52, guide the rolling surface 77 of the corresponding tapered roller 3, and the second protrusion 61 of the second coupling portion 58 is fitted in the second recess 71 of the small-diameter end surface of the tapered roller 3 to retain the tapered roller 3 in the second pocket 81.

As shown in FIG. 2, the tapered roller assembly 27 is configured so that one tapered roller 3 is held between two spacers 30 that are adjacent to each other in the circumferential direction. The held tapered roller 3 is arranged so that the large-diameter end surface faces the one side in the axial direction. One spacer 30, the tapered roller 3 that is accommodated in the first pocket 80 of the spacer 30, the tapered roller 3 that is accommodated in the second pocket 81 of the spacer 30 and the tapered roller 3 that is located adjacent to the third cage bar 53 of the spacer 30 and that slides over the third cage bar 53 constitute a minimum unit 88 of the tapered roller assembly 27.

The tapered roller assembly 27 is formed so that the minimum unit 88 is periodically repeatedly arranged in the circumferential direction. In other words, in this embodiment, one of the tapered rollers 3 slides over an opposite surface 84 of the first cage bar 51 to the surface adjacent to the second cage bar 52 in the circumferential direction A, and another one of the tapered rollers 3 slides over an opposite surface 85 of the third cage bar 53 to the surface adjacent to the second cage bar 52 in the circumferential direction A.

Figure 3:
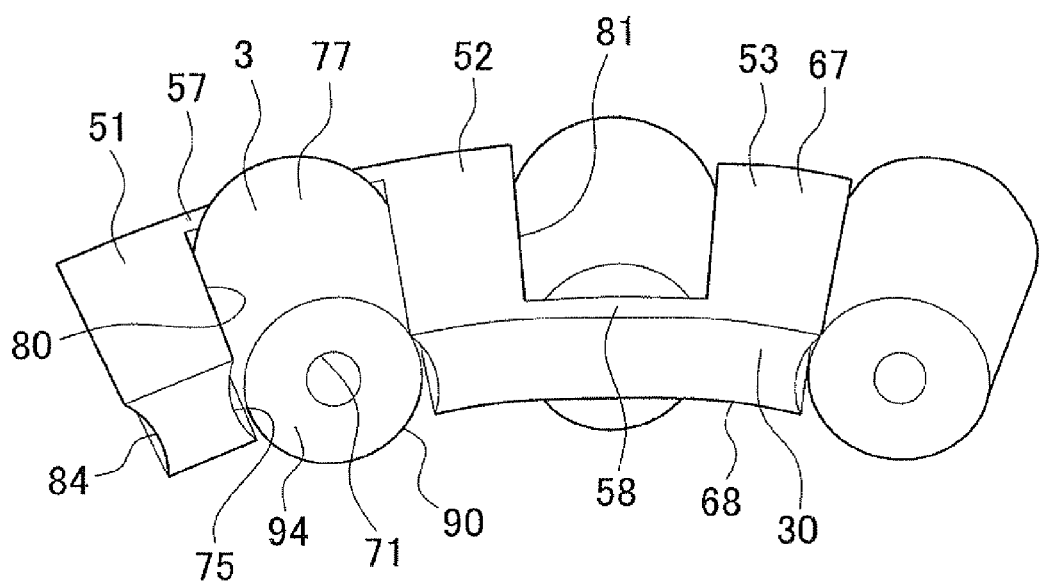
FIG. 3 is a view of a minimum unit in FIG. 2 when viewed from the other side in the axial direction.

FIG. 3 is a view of one of the minimum units 88 in FIG. 2 when viewed from the other side in the axial direction. Note that, in FIG. 3, the reference numeral 90 denotes the edge of the small-diameter end surface of the tapered roller 3, and the reference numeral 77 denotes the rolling surface of the tapered roller 3.

The thickness (size) of the spacer 30 in the radial direction of the tapered roller bearing is substantially constant, and is smaller than the diameter of the small-diameter end surface 94 of each tapered roller 3. As shown in FIG. 3, both end surfaces 84 and 75 in the circumferential direction at the other-side end portion of the first cage bar 51 in the axial direction each have a circular arc shape. In addition, the opening of the second recess 71 of the small-diameter end surface 94 of each tapered roller 3 has a circular shape.

In addition, as shown in FIG. 3, an outer end surface 67 of each spacer 30 in the radial direction (radial direction of the tapered roller bearing) has a circular arc shape in cross section, and radially faces the inner peripheral surface of the outer ring 2 (see FIG. 1) with a substantially constant gap. In addition, an inner end surface 68 of each spacer 30 in the radial direction (radial direction of the tapered roller bearing) has a circular arc shape in cross section, and radially faces the outer peripheral surface of the inner ring 1 (see FIG. 1) with a substantially constant gap.

Circumferential gaps of the retaining pockets of the tapered roller bearing are smaller than recessed portion gaps. The tapered roller bearing receives load in the circumferential direction from the tapered rollers 3 by the first cage bars 51, the second cage bars 52 and the third cage bars 53. In addition, the tapered roller bearing receives load in the radial direction from the tapered rollers 3 located in the pockets 80 and 81 by the spacers 30 in such a manner that the substantially cylindrical protrusions 60 and 61 (see FIG. 2) that protrude from the coupling portions 57 and 58 in the axial direction are engaged with the inner peripheral surfaces of the recesses 70 and 71 (see FIG. 2) of the end surfaces of the tapered rollers 3. In addition, the tapered roller bearing receives load in the axial direction from the tapered rollers 3 by the coupling portions 57 and 58 that are arranged in zigzag alignment.

Note that each spacer 30 may be formed of metal or may be formed of resin. When each spacer 30 is made of metal, the spacer 30 may be manufactured by forging, or the like. When the spacer 30 is made of resin, the spacer 30 may be manufactured by injection molding, or the like.

With the cage 5 according to the above embodiment, one spacer 30 includes two first and second pockets 80 and 81, the first and second pockets 80 and 81 are formed by only one spacer 30, the first and second pockets 80 and 81 are not formed by a plurality of spacers. Thus, the assemblability of the tapered rollers 3 is excellent.

In addition, with the cage 5 according to the above embodiment, each spacer 30 has an S shape and each spacer 30 is configured to retain two tapered rollers 3, so one spacer 30 cooperates with two tapered rollers 3 and each spacer 30 does not move independently of the tapered rollers 3. Thus, even when a circumferential gap between specific two tapered rollers 3 adjacent to each other in the circumferential direction increases because of lead and lag of the tapered rollers 3, because one spacer 30 cooperates with two tapered rollers 3, each spacer 30 does not slip off from the circumferential gap between the specific two tapered rollers 3 or no slipped-off spacer 30 gets stuck.

If each spacer has a general crank shape, the spacer is able to move independently of rollers, so, when a gap that occurs because of lead and lag of the rollers locally concentrates, the crank-shaped spacer may slip off or the spacer may get stuck. In addition, some of cages that use general spacers that are not limited to crank-shaped spacers may have a guide member that prevents disassembling of the spacers; however, the spacers used in the aspect of the invention do not require such a guide member at all.

In addition, with the cage 5 according to the embodiment, each spacer 30 has an S shape, each spacer 30 retains two tapered rollers 3 and a tapered roller 3 may be retained or may not be retained in a circumferential gap between the adjacent spacers 30, so, when lead and lag of the tapered rollers 3 occur, basically, compression strain that is hard to cause breakage occurs in the cage bars 51, 52 and 53 of each spacer 30. In other word, the cage 5 according to the above embodiment is able to receive lead and lag of the tapered rollers 3 as compression strain of the cage bars 51, 52 and 53 of each spacer 30.

More specifically, when lead and lag occur in the tapered roller 3 between the adjacent spacers 30, the lead and lag may be received by the cage bars 51 and 53 of the spacer 30 before or behind in the traveling direction of the tapered roller 3 as compression strain. In addition, when lead and lag occur in the tapered rollers 3 inside the pockets 80 and 81 of each spacer 30, tensile strain in the direction to expand the cage bar 51, 52 or 53 before or behind in the traveling direction in the pocket 80 or 81 temporarily occurs; however, force that cancels the tensile strain is immediately applied from the tapered roller 3 present before or behind in the traveling direction of that lead and lag to the cage bar 51, 52 or 53 receiving the tensile strain. Thus, only tensile strain that can be absorbed through the S shape occurs in the cage bar 51, 52 or 53 of each spacer 30, and the cage bars 51, 52 and 53 of each spacer 30 are basically able to receive lead and lag of the tapered rollers 3 through compression strain. Thus, with the cage 5 according to the above embodiment, only compression strain that is hard to cause breakage basically occurs in the cage bars 51, 52 and 53 of each spacer 30, so the strength and durability of the cage 5 may be remarkably excellent.

In addition, according to the above embodiment, the cage 5 is formed of a plurality of components that are separate from one another, so, even when the tapered roller bearing is a large-sized bearing having the outside diameter of about 2 m, components (for example, spacers) may be manufactured by a method, such as pressing and injection molding, by which small components may be manufactured at low cost, and it is possible to manufacture the cage 5 at low cost. In addition, the mass productivity of the cage 5 may also be improved.

In addition, with the cage according to the aspect of the invention, a roller may not be retained in about one gap between the adjacent spacers depending on the diameter of a bearing used. Thus, the cage according to the above aspect may be easily applied to a roller bearing having any size as circumstances demand, so the flexibility of arrangement increases. In contrast to this, in the general cage, the size of each spacer should be strictly and precisely determined on the basis of the diameter of a bearing used.

In addition, with the cage 5 according to the above embodiment, the other-side surface of the first coupling portion 57 in the axial direction has the first protrusion 60 that protrudes toward the other side in the axial direction, and the large-diameter end surface of the corresponding tapered roller 3 has the first recess 70 in which the first protrusion 60 is fitted, so the first protrusion 60 may be engaged with the first recess 70. In addition, similarly, the one-side surface of the second coupling portion 58 in the axial direction has the second protrusion 61 that protrudes toward the one side in the axial direction, and the small-diameter end surface of the corresponding tapered roller 3 has the second recess 71 in which the second protrusion 61 is fitted, so the second protrusion 61 may be engaged with the second recess 71. Thus, movement of the tapered rollers 3 in the radial direction may be effectively restricted by the engagement between the first protrusion 60 and the first recess 70 or between the second protrusion 61 and the second recess 71.

In addition, with the cage 5 according to the above embodiment, in the plurality of substantially S-shaped spacers 30 that constitute the cage 5, the tapered roller 3 is arranged in any gap between the spacers 30 adjacent to each other in the circumferential direction. Thus, the tapered rollers 3 may be arranged at substantially equal intervals in the circumferential direction, and load loading performance may be substantially uniform in the circumferential direction.

In addition, with the tapered roller bearing according to the above embodiment, each spacer 30 that constitutes the cage 5 is an S-shaped member having the two pockets 80 and 81, and each of the three cage bars 51, 52 and 53 of each spacer 30 is configured to extend in the axial direction of the tapered rollers, so the behavior of each spacer 30 may be stabilized between the inner ring 1 and the outer ring 2. Thus, for this reason as well, no member that guides the spacers 30 is required, so the number of components of the cage is reduced, and the manufacturing cost of the cage may be reduced.

Note that, in the cage 5 according to the above embodiment, in each spacer 30, the tapered roller 3 slides over the opposite surface 84 of the first cage bar 51 to the surface adjacent to the second cage bar 52, and, in each spacer 30, the tapered roller 3 slides over the opposite surface 85 of the third cage bar 53 to the surface adjacent to the second cage bar 52. However, in the aspect of the invention, spacers of which the number is larger than or equal to two and is smaller than or equal to the number of the spacers of the roller bearing may be configured to contact each other in the circumferential direction of the roller bearing.

In addition, in the cage 5 according to the above embodiment, the substantially cylindrical protrusions 60 and 61 that protrude from the respective coupling portions of each spacer 30 are formed on the end surfaces in the axial direction of the tapered rollers 3, and are respectively fitted in the recesses 70 and 71 having the shapes corresponding to the shapes of the protrusions 60 and 61 to thereby restrict movement of the tapered rollers 3 in the radial direction. However, in the aspect of the invention, protrusions that respectively protrude from the coupling portions of each spacer each may have a prismatic shape or may have a semi-circular shape, an elliptical shape, or the like, in cross section. In the aspect of the invention, protrusions that respectively protrude from the coupling portions of each spacer each may have any shape as long as the protrusions each protrude into the pocket in the axial direction. In addition, in the aspect of the invention, a recess formed on an end surface of each roller in the axial direction may have any shape corresponding to the shape of a protrusion that protrudes from the corresponding coupling portion of each spacer.

In addition, in the cage 5 according to the above embodiment, the substantially cylindrical protrusions 60 and 61 that respectively protrude from the coupling portions of each spacer 30 are respectively fitted to the recesses 70 and 71 that are formed on the end surfaces of the tapered rollers 3 in the axial direction and that have the shapes corresponding to the shapes of the protrusions 60 and 61. However, in the aspect of the invention, the coupling portions of each S-shaped spacer each may not have a protrusion, and the pocket-side end surfaces of the coupling portions each may have a planar shape or a curved surface having no protrusion. Note that, in this case, it is also applicable that pocket-side end surfaces of each cage bar (end surfaces in the circumferential direction of the roller bearing in each cage bar) have a curved surface having a circular arc in cross section corresponding to the rolling surface of each roller and each roller is held by two cage bars facing to each other in the circumferential direction to thereby restrict movement of the rollers in the radial direction.

In addition, in the above embodiment, the rolling elements are tapered rollers; instead, in the aspect of the invention, the rolling elements may be rollers, such as cylindrical rollers and convex rollers, other than tapered rollers.

Note that the cage according to the aspect of the invention may be used for a roller bearing for supporting a wind power generation main shaft. However, a roller bearing that is able to use the cage according to the aspect of the invention is not limited to the roller bearing for supporting a wind power generation main shaft. Then, the cage according to the aspect of the invention may be used for a roller bearing in any application for supporting a rotary shaft of a general industrial machinery, such as office equipment, semiconductor manufacturing equipment and a machine tool. In addition, a bearing that is able to use the cage according to the aspect of the invention may be a bearing used in a device other than the general industrial machinery.

What is claimed is:

1. A roller bearing comprising:
an inner raceway member that has an outer raceway surface;
an outer raceway member that has an inner raceway surface;
a plurality of rollers that are arranged between the inner raceway member and the outer raceway member; and
a roller bearing cage that retains the plurality of rollers, wherein
the roller bearing cage includes a plurality of spacers formed of a plurality of components that are separate from one another, the plurality of spacers being arranged along a circumference of the same circle,
each of the spacer includes:
a first cage bar that extends in substantially an axial direction of the circle, the axial direction defining a direction that is a direction perpendicular to a radial direction of the circle and perpendicular to the circumferential direction of the circle, the first cage bar having a first end portion disposed in a first axial direction and a second end portion disposed in a second axial direction;
a second cage bar that is located on one side of the first cage bar in the circumferential direction of the circle and that extends in substantially the axial direction, the second cage bar having a first end portion disposed in the first axial direction and a second end portion disposed in the second axial direction;
a third cage bar that is located on one side of the second cage bar in the circumferential direction and that extends in substantially the axial direction, the third cage bar having a first end portion disposed in the first axial direction and a second end portion disposed in the second axial direction;
a first coupling portion that couples the first end portion of the first cage bar to the first end portion of the second cage bar; and
a second coupling portion that couples the second end portion of the second cage bar to the second end portion of the third cage bar,
the first cage bar, the second cage bar and the first coupling portion define a first pocket that is open at the second axial direction side,
the second cage bar, the third cage bar and the second coupling portion define a second pocket that is open at the first axial direction side, and
the plurality of rollers are each retained in the first pocket or in the second pocket.

2. The roller bearing according to claim 1, wherein:
a surface of the first coupling portion at the second axial direction side has a first protrusion that protrudes toward the second axial direction side, and
a surface of the second coupling portion at the first axial direction side has a second protrusion that protrudes toward the first axial direction side.

3. The roller bearing according to claim 1, wherein
in each spacer, an opposite surface of the first cage bar to a surface adjacent to the second cage bar in the circumferential direction is a sliding surface over which a roller slides, and
in each spacer, an opposite surface of the third cage bar to a surface adjacent to the second cage bar in the circumferential direction is a sliding surface over which a roller slides.

4. The roller bearing according to claim 1, wherein
the plurality of rollers includes a first roller retained in the first pocket, and a second roller retained in the second pocket, and
an additional roller is disposed between a first spacer and a second spacer, the first spacer being adjacent to the second spacer along the circumference of the circle.

* * * * *